United States Patent
Di Cairano et al.

(10) Patent No.: US 9,199,667 B2
(45) Date of Patent: Dec. 1, 2015

(54) SYSTEM AND METHOD FOR SEMI-AUTONOMOUS DRIVING OF VEHICLES

(71) Applicant: Mitsubishi Electric Research Laboratories, Inc., Cambridge, MA (US)

(72) Inventors: Stefano Di Cairano, Somerville, MA (US); Spyridon Zafeiropoulos, Atlanta, GA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 75 days.

(21) Appl. No.: 14/210,723

(22) Filed: Mar. 14, 2014

(65) Prior Publication Data

US 2015/0259007 A1    Sep. 17, 2015

(51) Int. Cl.
A01B 69/00 (2006.01)
B62D 15/02 (2006.01)
B62D 5/00 (2006.01)
B62D 6/00 (2006.01)

(52) U.S. Cl.
CPC .............. *B62D 15/025* (2013.01); *B62D 5/001* (2013.01); *B62D 6/003* (2013.01); *B62D 6/008* (2013.01)

(58) Field of Classification Search
USPC ........................................................ 701/41
See application file for complete search history.

(56) References Cited

U.S. PATENT DOCUMENTS

| | | |
|---|---|---|
| 5,906,645 A | 5/1999 | Kagawa et al. |
| 6,363,305 B1 | 3/2002 | Kaufmann |
| 6,678,594 B2 | 1/2004 | Byers |
| 6,729,432 B1 | 5/2004 | Yao |
| 7,234,563 B2 | 6/2007 | Ogawa |
| 7,581,616 B2 | 9/2009 | Goto |
| 7,908,056 B2 | 3/2011 | Hwang |
| 8,190,330 B2 | 5/2012 | Lee |
| 8,442,713 B2 | 5/2013 | Kim |
| 2003/0019685 A1 | 1/2003 | Graber |
| 2005/0087384 A1 | 4/2005 | Magnus |
| 2005/0274565 A1 | 12/2005 | Greenwell |
| 2008/0196966 A1 * | 8/2008 | Maruyama et al. ........... 180/446 |
| 2009/0048736 A1 | 2/2009 | Kristensen |
| 2009/0240389 A1 * | 9/2009 | Nomura et al. ................. 701/29 |
| 2009/0306856 A1 * | 12/2009 | Fritz et al. ...................... 701/42 |
| 2009/0319114 A1 * | 12/2009 | Takenaka et al. ............... 701/29 |
| 2010/0212568 A1 | 8/2010 | Zanfei |
| 2011/0132682 A1 * | 6/2011 | Hwang et al. ................. 180/444 |
| 2011/0231052 A1 * | 9/2011 | Ellis et al. ....................... 701/29 |
| 2011/0276231 A1 | 11/2011 | Suzuki |
| 2012/0203431 A1 | 8/2012 | Kojo |

(Continued)

*Primary Examiner* — Hussein A. Elchanti
(74) *Attorney, Agent, or Firm* — Dirk Brinkman; Gennadiy Vinokur

(57) ABSTRACT

A method for a semi-autonomous driving of a vehicle with a steer-by-wire system having a steering wheel mechanically decoupled from vehicle wheels determines values for the steering angle and the wheels angle tracking a target value of the wheels angle received from a semi-autonomous driving planning (SADP) system. The method determines the values for the steering angle and the wheels angle subject to constraints, including a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels. The control commands to the column motor and the rack motor are generated according to the values for the steering angle and the wheels angle.

17 Claims, 13 Drawing Sheets

(56) References Cited

U.S. PATENT DOCUMENTS

| | | | |
|---|---|---|---|
| 2013/0006474 A1* | 1/2013 | Pyo | 701/41 |
| 2013/0041557 A1 | 2/2013 | Endo | |
| 2013/0096778 A1* | 4/2013 | Goto et al. | 701/41 |
| 2013/0245890 A1* | 9/2013 | Kageyama et al. | 701/41 |
| 2013/0304327 A1* | 11/2013 | Morishita et al. | 701/43 |
| 2014/0172236 A1* | 6/2014 | Nishikawa et al. | 701/42 |

\* cited by examiner

SYSTEM AND METHOD FOR SEMI-AUTONOMOUS DRIVING OF VEHICLES

FIELD OF THE INVENTION

This invention generally relates to a semi-autonomous driving of a vehicle, and more particularly to controlling a steer-by-wire system having a steering wheel mechanically decoupled from vehicle wheels during the semi-autonomous driving.

BACKGROUND OF THE INVENTION

In conventional steering systems for a vehicle, a steering wheel is connected via a steering column and a steering rack to one or more vehicle wheels. When the driver applies a rotational motion to the steering column, the motion is transferred via the steering column to a pinion. The pinion converts the rotational motion into translational motion of a steering rack, which moves the vehicle wheels. Hence, the steering wheel, the steering rack and the vehicle wheels are mechanically coupled such that the rotation of the steering wheel, e.g., an angle, a rate of change of the steering angle, and an acceleration of the rotation, uniquely determines the rotation of the vehicle wheels, and vice versa.

In active steering systems, an additional actuator, such as a variable gear ratio including a harmonic motor, provides an additional degree of freedom so that the rotation of the vehicle wheels is not directly determined by the rotation of the steering wheel. Thus, in the active steering systems, an electromechanical actuator can modify the state of the vehicle wheels regardless of the rotation steering wheel, although the rotation of the steering wheel is still controlled by the driver.

In steer-by-wire systems, see e.g., U.S. 20110132682, U.S. 20110276231, there is no mechanical linkage between the steering column and the steering rack. The steering wheel and vehicle wheels coupled to two actuators. One actuator arranged in the steering column controls the rotation of the steering wheel and another actuator arranged in the steering rack controls the rotation of the vehicle wheels. Accordingly, an independent control of the states of the steering wheel and the vehicle wheels is possible. The two actuators are controlled by an electronic control unit that is uses using torque sensors, angle sensors, and angular rate sensors located at the steering wheel and vehicle wheels, and possibly in intermediate positions for control of the steering wheel and the vehicle wheels.

Several methods describe the control of the steer-by-wire systems for the cases when the driver is controlling the vehicle. Specifically, those methods describe that the steering angle of the steering wheel is determined by the driver, and only an appropriate wheels angle is determined, possibly together with a feedback torque on the steering wheel. For example, patent documents U.S. Pat. No. 6,363,305, U.S. Pat. No. 7,908,056, U.S. Pat. No. 7,234,563 describe methods for generating an appropriate feedback torque on the steering wheel, and patent documents US20090048736 and US20030019685 describe methods for controlling the steering rack position and velocity through the steering wheel. Similarly, in U.S. application 20030055546, a method for controlling the rack position based on the driver controlled position of the steering wheel is described. That method also determines a feedback torque on the steering wheel to provide a tactile feedback to the driver.

During a semi-autonomous driving of the vehicle, a semi-autonomous driving planning (SADP) system can assist the driver while the driver still operates the vehicle. For example, the semi-autonomous driving of the vehicle can be used for collision avoidance, stability recovery, lane keeping, see, e.g., patent documents U.S. Pat. No. 8,190,330 and U.S. Pat. No. 8,442,713.

If semi-autonomous driving is used in the vehicles with the steer-by-wire systems, then the SADP determines only a target value for an angle of the vehicle wheels, because the angle of the vehicle wheels in the steer-by-wire system is controlled independently from the steering angle of the steering wheel. However, the steering wheel remains under control of the driver resulting in uncoordinated control of the steering wheel and the vehicle wheels.

SUMMARY OF THE INVENTION

In a vehicle with a steer-by-wire system, a steering wheel is mechanically decoupled from vehicle wheels, such that a steering angle of the steering wheel is controlled by a column motor independently from a wheel angle of the vehicle wheels controlled by a rack motor. During a semi-autonomous driving of such a vehicle, the driver still controls the steering wheel, and a proper interaction between the driver and the steering wheel is desired to provide a safe operation of the vehicle. Specifically, a target value for the wheels angle, determined by a semi-autonomous driving planning (SADP) system, have to be used to appropriately actuate both the vehicle wheels and the steering wheel.

In semi-autonomous mode of driving the vehicle, it is desired for the wheels angle to track as close as possible the target values received from the SADP system, while maintain drivability of the vehicle. In addition, the actuation of the steering wheel and the vehicle wheels needs to be constrained to ensure proper operation of the actuators, proper dynamical behavior of the vehicle, such as avoidance of instability and excessive lateral acceleration or jerk, and proper mechanical interaction with the driver, such as acceptable feedback torque and motion of the steering wheel.

Some embodiments of the invention are based on a realization that the control commands generated to control the vehicle during the semi-autonomous driving need to ensure that the steering angle and the wheels angle jointly track the target value of the wheels angle, but not necessarily at the same rate. For example, the wheels angle needs to be aligned with the target value as rapid as possible, but the alignment of the steering angle can be delayed to limit the motion of the steering wheel to the rate acceptable for the driver.

In addition, the relative motion of the steering wheel with respect to the motion of the vehicle wheels needs also be constraint to ensure drivability of the vehicle. For example, one embodiment determines the constraint on the relative motion of the steering wheel and the vehicle wheels based on drivability considerations defining an extent of the angle difference and/or the angular rate difference between steering wheel and vehicle wheels before the driver feels the loss of the control and drivability of the vehicle. The drivability considerations can depend on the type of the vehicle and/or conditions of the movement of the vehicle and the constraint on the relative motion can limit the rapidness of alignment of the wheels angle with the target value.

Accordingly, some embodiments of the invention determine values for the steering angle and the wheels angle tracking the target value of the wheels angle subject to constraints including a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels. The embodiments generate control commands to the column motor and the rack motor according to the values for the steering angle and the wheels angle to achieve the coordinated control of the steering wheel and the vehicle wheels during the semi-autonomous mode of driving the vehicle.

For example, one embodiment discloses a method for a semi-autonomous driving of a vehicle with a steer-by-wire system having a steering wheel mechanically decoupled from vehicle wheels, such that a steering angle of the steering wheel is controlled by a column motor independently from a wheels angle of the vehicle wheels controlled by a rack motor. The method includes receiving from a semi-autonomous driving planning (SADP) system a target value for the wheels angle; determining values for the steering angle and the wheels angle tracking the target value of the wheels angle subject to constraints, including a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels; and generating control commands to the column motor and the rack motor according to the values for the steering angle and the wheels angle. The steps of the method are performed by a processor.

Another embodiment discloses a steer-by-wire system for controlling an operation of a vehicle, including a steering rack subsystem for controlling a wheels angle of vehicle wheels via a motion of a rack motor; a steering column subsystem for controlling a steering angle of a steering wheel via a motion of a column motor, wherein the steering wheel is mechanically decoupled from the vehicle wheels, such that the steering angle of the steering wheel is controlled by the column motor independently from the wheels angle of the vehicle wheels controlled by the rack motor; and a control system, including: a semi-autonomous driving planning (SADP) system for determining a target value for the wheels angle; and an electronic control unit (ECU) for determining values for the steering angle and the wheels angle tracking the target value of the wheels angle subject to constraints including a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels, and for generating control commands to the column motor and the rack motor according to the values for the steering angle and the wheels angle.

Yet another embodiment discloses a method for driving of a vehicle with a steer-by-wire system having a steering wheel mechanically decoupled from vehicle wheels, such that a steering angle of the steering wheel is controlled by a column motor independently from a wheel angle of the vehicle wheels controlled by a rack motor, including determining a target value of a vehicle wheels angle misaligned with a state of the steering wheel; determining jointly a value for the steering angle and a value for the wheels angle based on the target value of the wheels angle subject to constraints including a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels; and controlling concurrently a rack motor according to the value of the wheels angle and a column motor according to the value of the steering angle.

DETAILED DESCRIPTION OF THE PREFERRED EMBODIMENTS

During semi-autonomous driving of a vehicle with a steer-by-wire system, a target value for a vehicle wheel angle is provided by a semi-autonomous driving planning (SADP) system while a driver operates the vehicle by controlling a motion of a steering wheel. Usually, the semi-autonomous driving mode is not driver initiated, but occurs due to some potentially dangerous or abnormal condition that requires prompt corrective actions.

Some embodiments of the invention are based on a realization that during the initiation and operation of the vehicle in the semi-autonomous mode, certain actions and constraints need to be enforced to achieve an acceptable interaction between the movement of the vehicle, e.g., wheels angles reacting to the target values received from the SADP system, and the driver holding and possibly actuating the steering wheel of the vehicle.

Figure 1A:
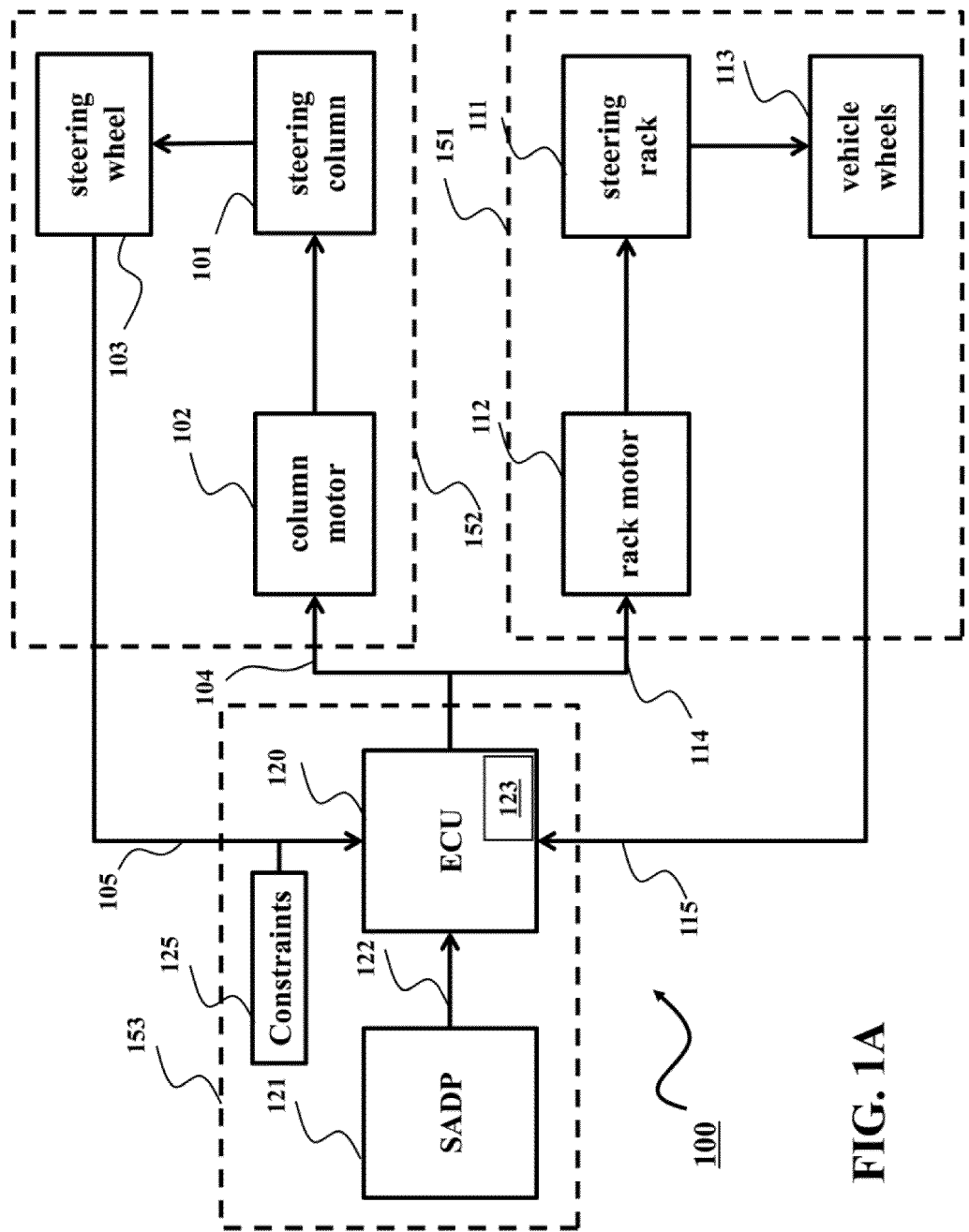
FIG. 1A is a block diagram of a steer-by-wire system for controlling an operation of a vehicle in a semi-autonomous driving mode according to some embodiments of the invention.
Figure 1B:
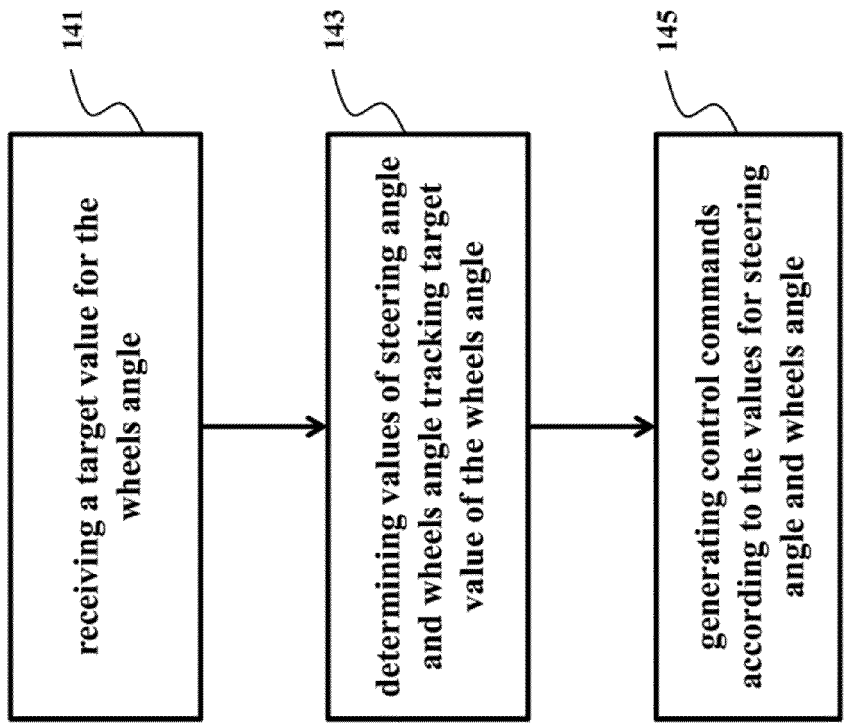
FIG. 1B is a flow chart of the method for a semi-autonomous driving of a vehicle with the steer-by-wire of FIG. 1A.

FIG. 1A shows a block diagram of a steer-by-wire system 100 suitable for controlling an operation of a vehicle in a semi-autonomous driving mode according to some embodiments of the invention. FIG. 1B shows a flow chart of the method for a semi-autonomous driving of a vehicle with the steer-by-wire 100.

The steer-by-wire system 100 includes a steering rack subsystem 151, a steering column subsystem 152, and a control system 153. The steering column subsystem 152 includes a steering column 101 actuated by a column motor 102 connected to a steering wheel 103, such that the motion of the column motor controls a steering angle of the steering wheel. The steering rack subsystem 151 includes a steering rack 111 actuated by a rack motor 112 and connected to vehicle wheels 113, such that the motion of the rack motors control a wheel angle of the vehicle wheels.

In the steer-by-wire system 100, the steering wheel 103 is mechanically decoupled from the vehicle wheels 113, such that the steering angle of the steering wheel is controlled by the column motor independently from a wheel angle of the vehicle wheels controlled by the rack motor. The column motor and the rack motor receive commands 114, 104, from an electronic control unit (ECU) 120. The ECU can include a processor 123 for performing the operations described herein.

The ECU, upon enabling the semi-autonomous mode, receives 141 from a semi-autonomous driving planning (SADP) system 121, a target value 122 for the wheels angle. The ECU also receives a signal 105 describing a current state of the steering wheel and a signal 115 describing a current state of the vehicle wheels. The ECU determines 143 values for the steering angle and the wheels angle tracking the target value of the wheels angle and generates 145 a control command 104 to the column motor and a control command 114 to the rack motor according to the values for the steering angle and the wheels angle.

The ECU jointly determines the values for the steering angle and the wheels angle subject to constraints 125 on the state of the steering wheel 103 and the state of the vehicle wheels 113. The constraints 125 can include a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels.

Some embodiments of the invention are based on a realization that the control commands generated to control the vehicle during the semi-autonomous driving need to ensure that the steering angle and the wheels angle jointly track the target value of the wheels angle, but not necessarily at the same rate. For example, the wheels angle needs to be aligned with the target value as rapid as possible, but the alignment of the steering angle can be delayed to limit the motion of the steering wheel to the rate acceptable for the driver.

In addition, the relative motion of the steering wheel with respect to the motion of the vehicle wheels needs also be constraint to ensure drivability of the vehicle. For example, one embodiment determines the constraint on the relative motion of the steering wheel and the vehicle wheels based on drivability considerations defining an extent of the angle difference and/or the angular rate difference between steering wheel and vehicle wheels before the driver feels the loss of the control and drivability of the vehicle. The drivability considerations can depend on the type of the vehicle and/or conditions of the movement of the vehicle and the constraint on the relative motion can limit the rapidness of alignment of the wheels angle with the target value.

Figure 2B:
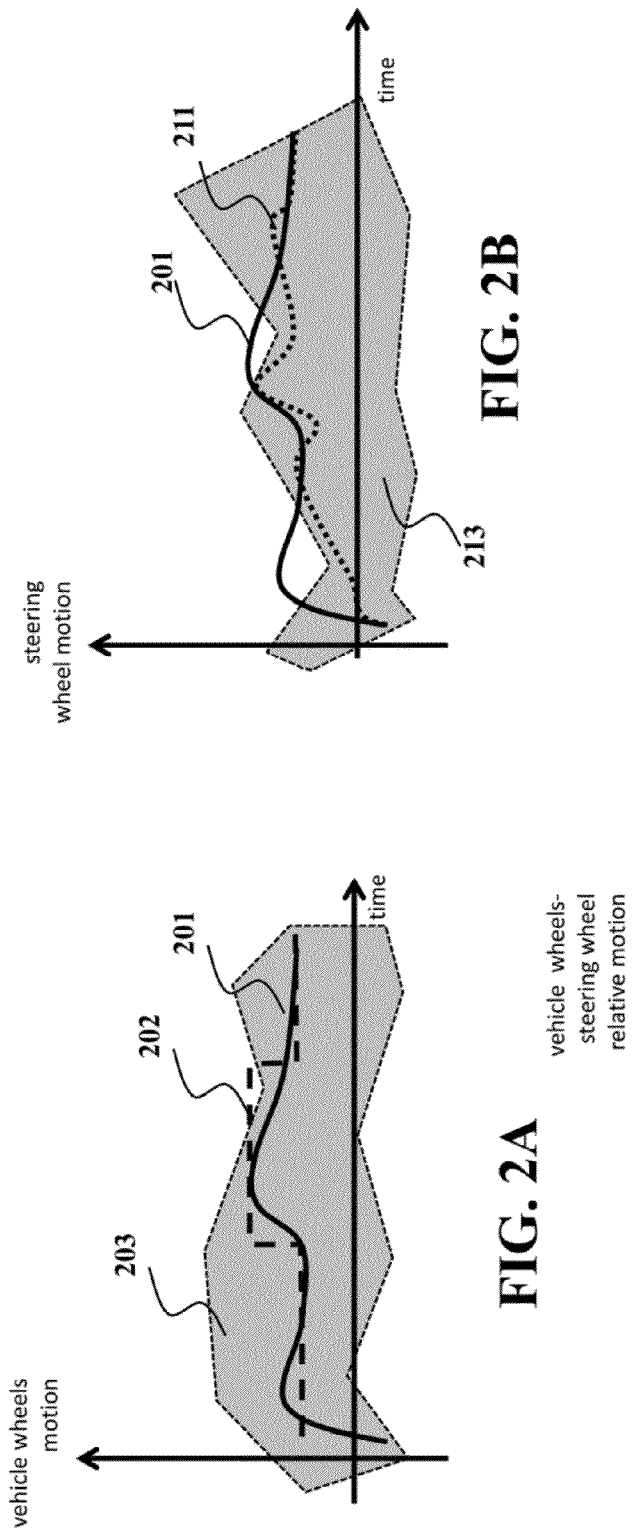
FIGS. 2A, 2B and 2C are schematic of various constraints on states of a steering wheel and vehicle wheels during the semi-autonomous mode of driving the vehicle according to some embodiments of the invention.
Figure 2A:
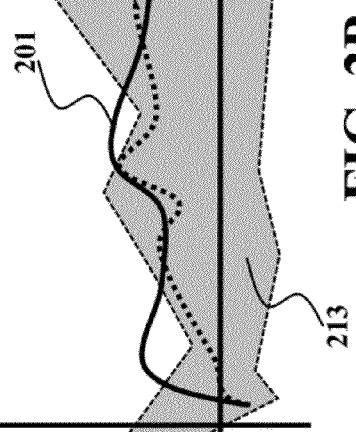
Figure 2C:
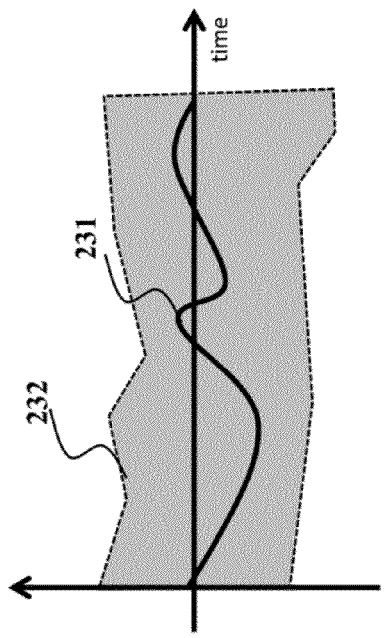
Figure 2E:
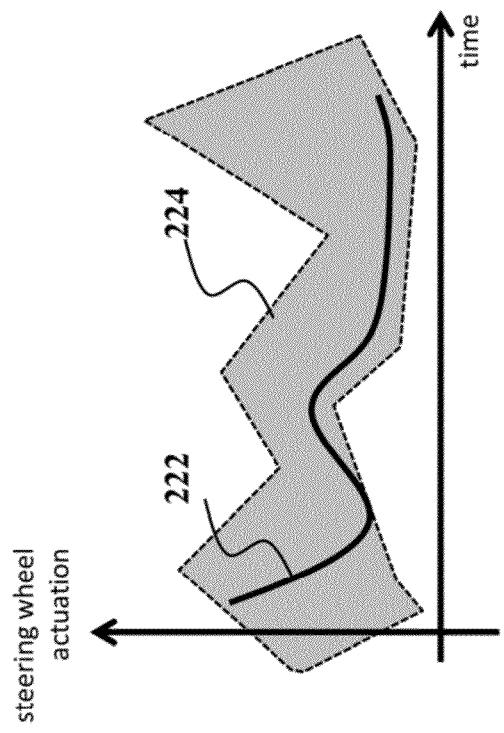
FIGS. 2D and 2E are schematic of various constraints on actuations of the steering wheel and the vehicle wheels.
Figure 2D:
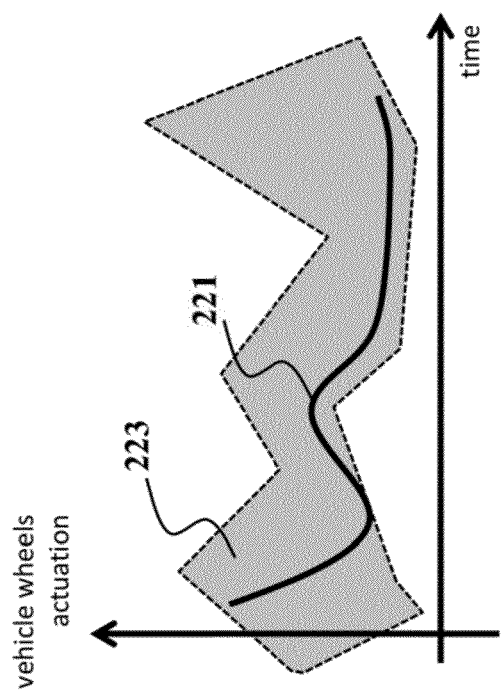

FIGS. 2A, 2B and 2C show a schematic of various constraints on the state of the steering wheel and the state of the vehicle wheels during the semi-autonomous mode of driving the vehicle according to some embodiments of the invention. In addition, FIGS. 2D and 2E show a schematic of various constraints on actuations of the steering wheel and the vehicle wheels.

For example, FIG. 2A shows a graph plotting the constraint on a motion of the vehicle wheels specifying that the wheels angle 201 needs to rapidly track the target value 202 of the wheels angle received from the SADP system, such that the motion of the vehicle wheels is in the acceptable region 203 ensuring the safe impact on the movement of the vehicle.

FIG. 2B shows a graph plotting the constraint on a motion of the steering wheel specifying that steering angle 211 needs to eventually align with the wheels angle 212, such that the motion of the steering wheel is in the acceptable region 213 ensuring the safe impact on the driver holding the steering wheel.

FIG. 2C shows a graph plotting the constraint on a relative motion 231 of the steering wheel with respect to the motion of the vehicle wheels specifying that the relative motion 231 needs to be in the acceptable region 232 ensuring that the misalignment between the wheels angle and the steering angle is small enough to not disorient the driver.

FIGS. 2D and 2E show graphs plotting the constraints for the actuators to be operated in such a way that the actuation 221 on the vehicle wheels 221 remains in the region 223 of correct operation of the actuator and the actuation on the steering wheels 222 remains in the corresponding region 224.

Figure 3A:
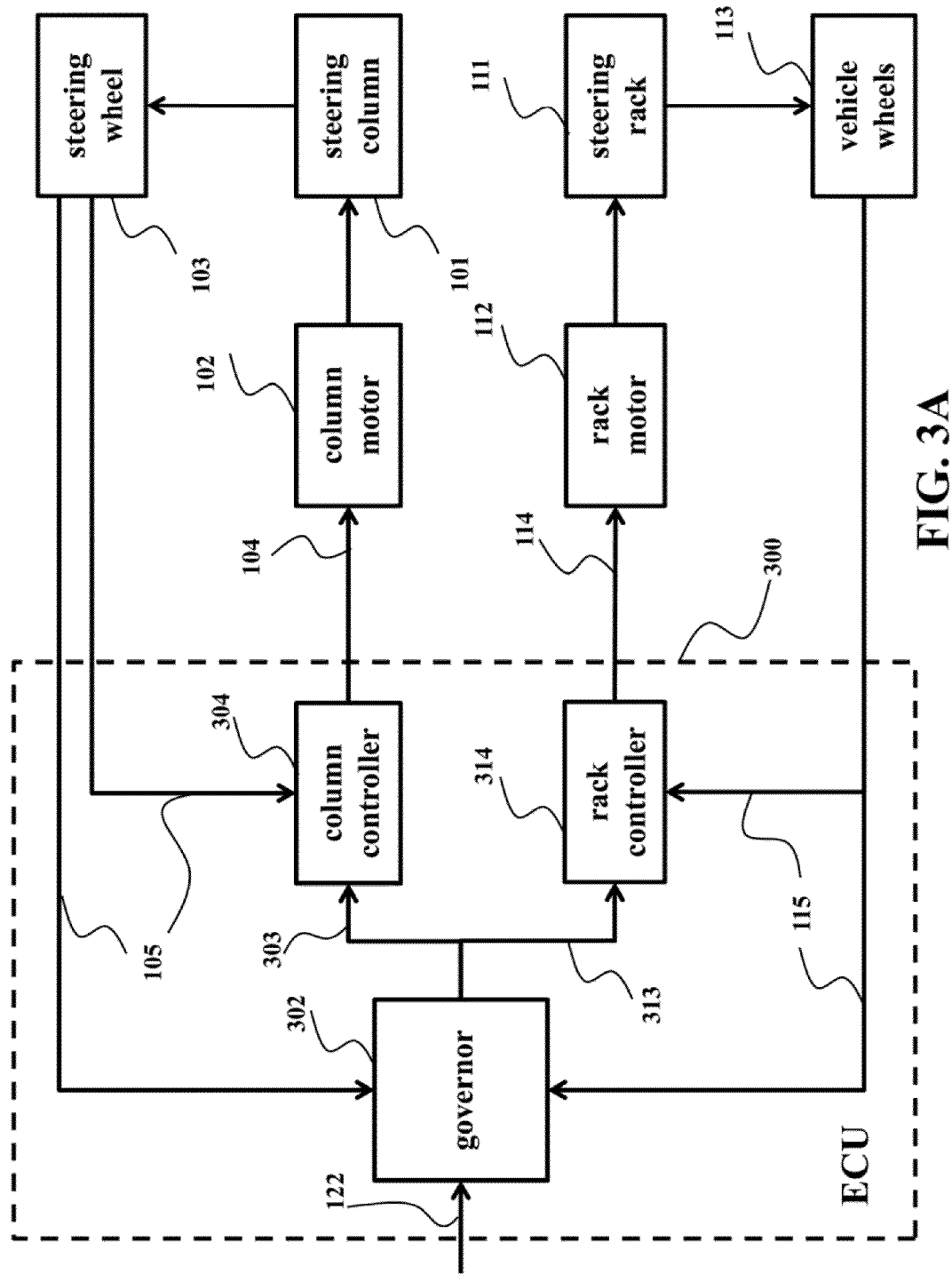
FIG. 3A is a block diagram of electronic control unit (ECU) according to one embodiment of the invention.

FIG. 3A shows a block diagram of the ECU 300 implementing objectives of the ECU 120 according to one embodiment of the invention. The ECU 300 includes a governor 302 for nonlinearly filtering the target value of the wheels angle 122 received from the SADP system based on the current state 105 of the steering column subsystem and of the current state 115 of the steering rack subsystem.

The governor determines a value for the steering angle 303 and a value of the wheels angle 314 and submits the values for the steering angle and the wheels angle to a column controller 304 and a rack controller 314, respectively. The column controller and the rack controller generate control commands to the column motor and the rack motor according to the values for the steering angle and the wheels angle. Specifically, the column controller 304 generates the control command 104 for the column motor 101 to control and modify the state of steering wheel 103 and the rack controller 314 generates the control command 114 for the rack motor 111 to control and modify the state of the vehicle wheels 113. In various embodiments, the governor determines the values for the steering angle and the wheels angle such that the modification of the states of steering wheel and the vehicle wheel satisfy the constraints 125 shown in FIG. 1 according to the principles illustrated in FIGS. 2A-2C and FIG. 2D-2E.

In some embodiments, the governor applies a nonlinear filter iteratively, e.g., at each time step of control. Similarly, the control commands to the column motor and the rack motor are generated concurrently at each step of control. Notably, in some embodiments, the target value for the wheels angle is determined based on a state of a movement of the vehicle and an objective of the movement of the vehicle and is misaligned with current values for the steering angle and the wheels angle. For example, the target value of the wheels angle can be determined independently from a current angle of the steering wheel, however, the ECU of various embodiments of the invention ensure that both the steering angle and the wheels angle track that target value.

Figure 3B:
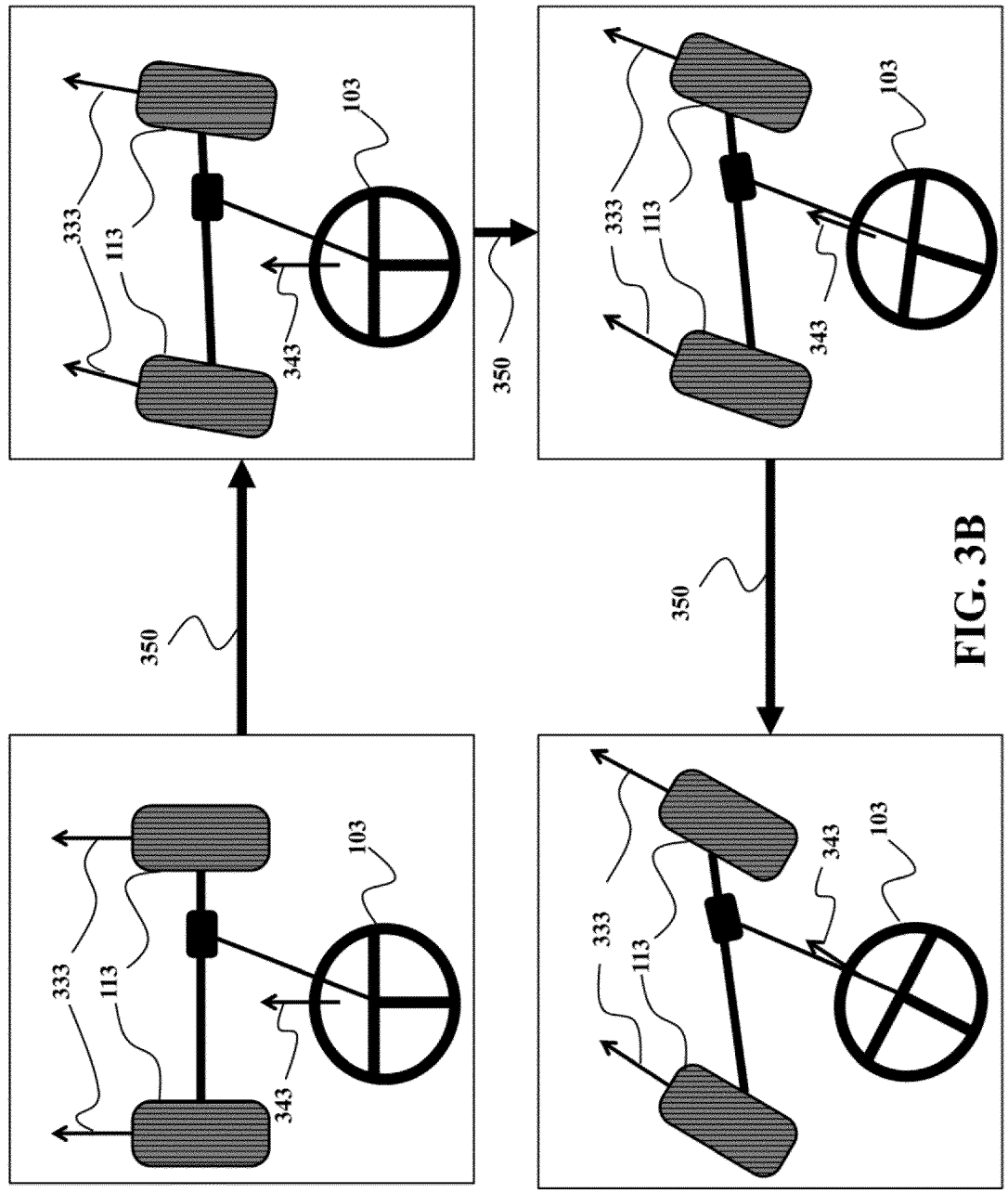
FIG. 3B is a schematic illustrating an effect of various embodiments of the invention.

FIG. 3B shows a schematic of the steer-by-wire system illustrating an effect of various embodiments of the invention. The arrows 333 represents the wheels angle of the vehicle wheels 113, and the arrow 343 represents the steering angle of the steering wheel 103. At each time step of the control, the steering angle and the wheels angle track 350 the target value for the wheels angle, but not necessarily at the same rate.

Mathematical Model of the Steering System

In some embodiments of this invention, the design of the vehicle wheels controller and steering wheel controller is based on linear models for the steering rack subsystem and the steering column subsystem, respectively.

For instance the steering rack subsystem can be modeled by a vehicle wheels system $$\dot{\delta}_r = \phi_r,$$

$$J_r \dot{\phi}_r = -\beta_r \phi_r + T_{mot,r} - T_{ala}, \quad (1)$$

where $\phi_r$ [rad/s] is the vehicle wheels angular rate, $\delta_r$ [rad] is the vehicle wheels angle, $T_{mot,r}$ [Nm] is the torque generated by the steering rack motor, $J_r$ [kg m$^2$] the steering rack and steering wheel moment of inertia, $\beta_r$ [Nm s/rad] the friction coefficient of the steering rack subsystem, and $T_{aln}$ [Nm] is the alignment torque, which is the reaction force of the ground on the vehicle wheels.

The steering column subsystem can be modeled by a steering wheel system $$\dot{\delta}_w = \phi_w,$$

$$J_w \dot{\phi}_w = -\beta_w \phi_w + T_{drv} + T_{mot,w}, \quad (2)$$

where $\phi_w$ [rad/s] is the steering wheel angle rate, $\delta_w$ [rad] the steering wheel angle, $T_{mot,w}$ [Nm] is the torque generated by the steering wheel motor, $J_w$ [kg m$^2$] is the steering wheel and steering column moment of inertia, $\beta_w$ [Nm s/rad] is the friction coefficient of the steering wheel subsystem, and $T_{drv}$ [Nm] is the torque generated by the driver.

The steering rack motor can be commanded so that the alignment torque is cancelled and a torque is provided to steer the vehicle wheels $$T_{mot,r} = T_{aln} + T_r \quad (3)$$

wherein $T_r$ is the net rack steering torque.

The steering wheel motor can be commanded so that the driver torque is cancelled and a torque is provided to steer the steering wheel $$T_{mot,w} = -T_{drv} + T_w, \quad (4)$$

wherein $T_w$ is the net column steering torque.

Design of Feedback Controllers of Steering Wheel and Vehicle Wheels Angles

In some embodiments, the column and the rack controllers are designed such that the closed loop systems are asymptotically stable and have unitary DC-gain from the control commands to the vehicle wheels and the steering wheel modifying, respectively, the state of the vehicle wheels and the steering wheel.

in one embodiment of the invention the controllers are designed based on discrete-time linear system models of the vehicle wheels system and steering wheel system. By sampling with a constant sampling period $T_s$ Equations (1) and (3), the vehicle wheels system can be formulated as the linear system $$x_r(k+1) = A_r x_r(k) + B_r u_r(k),$$

$$y_r(k) = C_r x_r(k), \quad (5)$$

where k is the sampling instant $x_r = (\delta_r, \phi_r)' \in R^2$ is the vehicle wheels system state vector, $u_r = T_{steer} \in R$ is the vehicle wheels system control input, and $y = \delta_r \in R$ is the vehicle wheels system output. Applying the same procedure to equations (3), (4), the steering wheel system can be formulated as $$x_w(k+1) A_w x_w(k) + B_w u_w(k),$$

$$y_w(k) = C_w x_w(k), \quad (6)$$

where k is the sampling instant $x_w = (\delta_w, \phi_w)' \in R^2$ is the steering wheel system state vector, $u_w = T_w \in R$ is the steering wheel system control input, and $y_w = \delta_w \in R$ is the steering wheel system output.

From (5) and (6) two controllers can be designed to generate the control commands for the vehicle wheels and the steering wheel, in the form of state feedback plus desired angle feedforward $$u_r = K_r x_r + H_r v_r, \quad (7)$$

$$u_w = K_w x_w + H_w v_w, \quad (8)$$

wherein $v_r$, $v_w$ are the feedforward commands on the vehicle wheels and steering wheel, respectively, the matrices $K_r$ and $K_w$ are designed such that $(A_r + B_r K_r)$, $(A_w + B_w K_w)$ have all eigenvalues inside the unit circle, i.e., the controlled systems are asymptotically stable. The coefficients $H_r$, $H_w$ are designed such that the controlled systems have unitary dc-gain, e.g., the dc-gains are equal to 1. Being dc-gain equal to 1, $v_r$, $v_w$ are interpreted as the commanded angles for vehicle wheels and steering wheels, respectively.

Different embodiments of the invention use multiple techniques to design such controllers, such as pole placements, LQR, H-infinity designs. Also, alternative controllers can be designed such as PI controllers, dynamic controllers, as long as the closed-loop systems are obtained to be asymptotically stable systems with unitary dc-gains.

Constraints on State of Steering Wheel and Vehicle Wheels

It is realized that for proper operation of the steer-by-wire system ensuring the coordinated control of the steering wheel and the vehicle wheels, several constraints need to be enforced. For example, the constraints can include a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels.

The constraint on the motion of the vehicle wheels can include one or a combination of a constraint on the wheels angle, a constraint on a rate of change of the wheels angle and a constraint on an angular acceleration of the wheels angle. For example, the constraint on the motion of the vehicle wheels can include lower and upper bounds on the vehicle wheels angle respectively, due to physical limits on the steering system and maximal lateral acceleration that can be achieved for given vehicle speed without losing stability of the vehicle, $$\delta_{r,min} \leq \delta_r \leq \delta_{r,max}, \quad (9)$$

wherein $\delta_{r,min}$, $\delta_{r,max}$ are the values of said lower and upper bound (respectively) on the vehicle wheels angle.

The constraint on the motion of the vehicle wheels can include upper and lower bounds on angular rate of the vehicle wheels, due to maximal lateral acceleration, jerk and roll moments acceptable for the vehicle $$\phi_{r,min} \leq \phi_r \leq \phi_{r,max}, \quad (10)$$

wherein $\phi_{r,min}$, $\phi_{r,max}$ are the values of said lower and upper bound (respectively) on angular rate of the vehicle wheels.

The constraint on the motion of the vehicle wheels can include upper and lower bounds on angular acceleration of the vehicle wheels, due to maximal lateral acceleration, jerk and roll moments acceptable for the vehicle $$\dot{\phi}_{r,min} \leq \dot{\phi}_r \leq \dot{\phi}_{r,max}, \quad (11)$$

wherein $\dot{\phi}_{r,min}$, $\dot{\phi}_{r,max}$, are the values of said lower and upper bound (respectively) on angular acceleration of the vehicle wheels.

The upper and lower bounds on the angular acceleration vehicle wheels can also be due to maximal variation of roll moments lateral jerk that are acceptable for the vehicle.

Additionally, the constraint on the motion of the steering wheel ensures that a motion of the steering wheel is acceptable for the driver holding the steering wheel. Failure to constraint the motion of the steering wheel can result in the feeling of losing control of the vehicle. In some embodiments, the constraint on the motion of the steering wheel includes one or a combination of a constraint on the steering angle, a constraint on a rate of change of the steering angle and a constraint on an angular acceleration of the steering wheel.

For example, the constraint on the motion of the steering wheel can include a constraint on the steering wheel angle, due to driver limits in rotating the steering wheel $$\delta_{w,min} \leq \delta_w \leq \delta_{w,max}, \quad (12)$$

wherein $\delta_{w,min}$, $\delta_{w,max}$, are the values of said lower and upper bound (respectively) on the steering wheel angle.

The constraint on the motion of the steering wheel can include upper and lower bounds on angular rate of the steering wheel, due to capability of the driver to follow the motion of the steering wheel, $$\phi_{w,min} \leq \phi_w \leq \phi_{w,max}, \quad (13)$$

wherein $\phi_{r,min}$, $\phi_{r,max}$, are the values of said lower and upper bound (respectively) on angular rate of the steering wheel.

The constraint on the motion of the steering wheel can include upper and lower bounds on angular acceleration of the steering wheel also due to capability of the driver to follow the motion of the steering wheel $$\dot{\phi}_{w,min} \leq \dot{\phi}_w \leq \dot{\phi}_{w,max}, \quad (14)$$

wherein $\dot{\phi}_{r,min}$, $\dot{\phi}_{r,max}$, are the values of said lower and upper bound (respectively) on angular rate of the steering wheel.

The actuators on the vehicle wheel angle and the steering wheel angle needs to actuate the components in a way compatible with the correct operation of the actuators. Considering the maximal values of alignment moment torque and the maximum amount of torque that the driver exercise in normal driving conditions, this results in constraints on the net rack steering torque $$T_{r,min} \leq T_r \leq T_{r,max}, \quad (15a)$$

wherein $T_{r,min}$, $T_{r,max}$, are the values of said lower and upper bound (respectively) on the net rack steering torque, $$T_{w,min} \leq T_w \leq T_{w,max}, \quad (15b)$$

wherein $T_{w,min}$, $T_{w,max}$, are the values of said lower and upper bound (respectively) on the net column steering torque.

In addition, the relative motion of the steering wheel with respect to the motion of the vehicle wheels needs also be constraint to ensure drivability of the vehicle. For example, one embodiment determines the constraint on the relative motion of the steering wheel and the vehicle wheels based on drivability considerations defining an extent of the angle difference and/or the angular rate difference between steering wheel and vehicle wheels before the driver feels the loss of the control and drivability of the vehicle.

In some embodiments of this invention, the constraint on the relative motion of the steering wheel with respect to the motion of the vehicle wheels includes one or combination of a constraint on a difference between the wheels angle and a scaled steering angle, a constraint on a difference between a rate of change of the wheels angle and a scaled rate of change of the steering angle, and a constraint on a difference between an angular acceleration of the wheels angle and a scaled angular acceleration of the steering angle.

For example, the constraint on maximal angular misalignment can include a constraint on the difference between vehicle wheels angle multiplied by a nominal steering gear ratio, g, and steering wheel angle according to $$|\delta_w - g\delta_r| \leq C_1, \quad (16)$$

wherein $C_1$ is a constant that defines the maximum angular misalignment tolerated by the driver, and can be calibrated in different ways for different driver characteristics and driving conditions. For instance, expert drivers would require a small value of $C_1$, wanting the vehicle to responding to their commands, while inexperienced drivers want a larger value of $C_1$, letting more freedom for the system in controlling the vehicle wheels.

In some other embodiments, the constraint on a maximal angular misalignment can include a constraint on the difference between the wheels angle determined to change the state of the vehicle wheels multiplied by a nominal steering gear ratio, g, and steering angle determined to change the state of the steering wheel according to $$|v_w - gv_r| \leq C_2, \quad (17)$$

where $C_2$ is a constant that defines the maximum angular misalignment command tolerated by the driver, and can be calibrated in different ways for different driver characteristics and driving conditions, similar to $C_1$.

In some embodiments of this invention, a constraint on a maximal difference of an angular rate can include a constraint on the difference between an angular rate of the vehicle wheels multiplied by a nominal steering gear ratio g, and an angular rate of the steering wheel according to $$|\phi_w - g\phi_r| \leq C_3, \quad (18)$$

where $C_3$ is a constant that defines the maximum difference between the steering wheel angular rate and the vehicle wheels angular rate tolerated by the driver, and can be calibrated in different ways for different driver characteristics and driving conditions, similar to calibration of the constant $C_1$.

In some embodiments of the invention, a constraint on a maximal difference of the angular rate can include a constraint on the difference of the angular rate between vehicle wheels and the steering wheel, normalized with respect to its maximum value and steering wheel angular rate normalized with respect to its maximum value according to $$\left| \frac{\phi_w}{\phi_{w,max}} - \frac{\phi_r}{\phi_{r,max}} \right| \leq C_4, \quad (19)$$

where $C_4$ is a constant that defines the maximum difference between the normalized steering wheel angular rate and vehicle wheels angular rate tolerated by the driver, and can be calibrated in different ways for different driver characteristics and driving conditions, similar to the calibration of the constant $C_1$.

In some embodiments of the invention, a constraint on a maximal difference of the angular acceleration can include a constraint on the difference of angular acceleration between vehicle wheels and the steering wheel multiplied by a nominal steering gear ratio g, and steering wheel angular acceleration $$|\alpha_w - g\alpha_r| \leq C_5, \quad (20)$$

where $C_5$ is a constant that defines the maximum difference between the normalized steering wheel angular acceleration and vehicle wheels angular acceleration tolerated by the driver, and can be calibrated in different ways for different driver characteristics and driving conditions, similar to $C_1$.

In some embodiments of this invention, a constraint on a maximal difference angular acceleration can include a constraint on the difference of angular rate between vehicle wheels and the steering wheel, normalized with respect to its maximum value and steering wheel angular rate normalized with respect to its maximum value according to $$\left| \frac{\alpha_w}{\alpha_{w,max}} - \frac{\alpha_r}{\alpha_{r,max}} \right| \leq C_6, \quad (21)$$

where $C_6$ is a constant that defines the maximum difference between the normalized steering wheel angular rate and vehicle wheels angular rate tolerated by the driver, and can be calibrated in different ways for different driver characteristics and driving conditions, similar to the calibration of the constant $C_1$.

In some embodiments of this invention it is realized that additionally or alternatively to the constraints, the alignment between the steering wheel and the steering angle can be defined as a cost function used in generating control commands for the steering system.

For example, some embodiments optimize, subject to the constraints, a cost function specifying a first relationship between the wheels angle and the target value of the wheels angle, and a second relationship between the steering angle and the wheels angle. For example, the first relationship can include a squared difference between the wheels angle and the target value of the wheels angle, and the second relationship can include a squared difference between a scaled wheels angle and the steering angle.

For example, the misalignment between steering angle and wheels angle can be represented as the cost function $$J_\delta = (\delta_w - g\delta_r)^2, \quad (22)$$

which is the squared 2-norm of the difference between the steering wheel angle and the vehicle wheels angle multiplied by the nominal steering ratio g. Other equivalent cost functions can also be used, such as the l-norm, the infinity-norm, etc. In addition, the representation of the constraints via the cost function can also be applied also to any other constraint in equations (26)-(31) to obtain similar cost functions, e.g., $J_v$ for (27) J . . . for (28), etc.

One embodiment combines such cost functions into a compound cost function $$J = q_\delta J_\delta + q_\phi J_\phi +  \quad (23)$$

where q•, q•, are nonnegative weights, which can be equal to zero when the corresponding objective is not of interest.

Coordinated Control of Steering and Vehicle Wheels Subject to Constraints

In a vehicle control system with semi-autonomous driving mode the SADP system can provide a target value for the wheels angle, i.e., a target angle. The steering control system controls the steering actuators such that the wheels angle and the steering angle track and eventually align with the target angle. However, the SADP system is not be aware of the status of the steering system and hence is not be able to enforce the constraints on the steering system. Accordingly, some embodiments of the invention iteratively modify the target angle to determine the values for the steering angle and the wheels angle asymptotically tracking the target value of the wheels angle while satisfying the constraints at each iteration.

Figure 4:
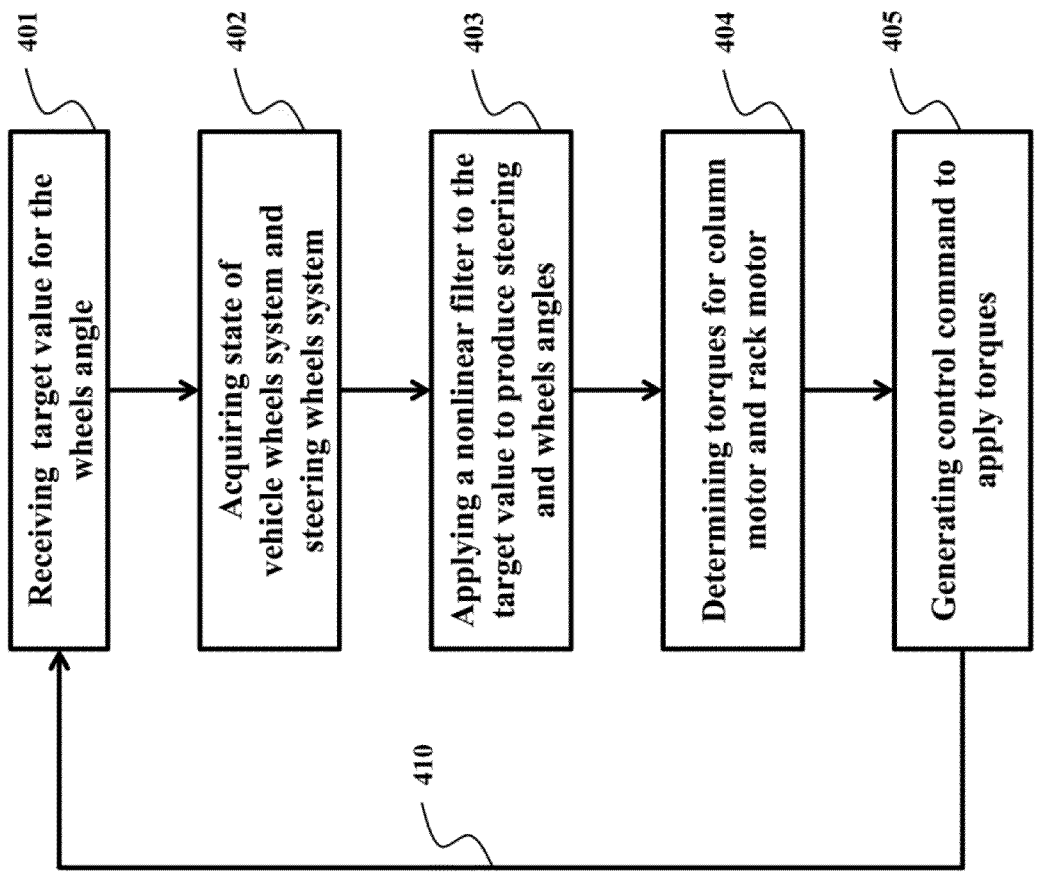
FIG. 4 is a flow chart of a method for coordinated control of steering wheel and vehicles wheel subject to constraints according to some embodiments of the invention.

FIG. 4 shows a flow chart of a method for coordinated control of steering wheel and vehicles wheel subject to constraints according to some embodiments of the invention. The method receives 401 the target value for the wheels angle and acquires 402 the state of the vehicle wheels system and the steering wheels system. The method applies 403 a nonlinear filter to the target value of the wheels angle to determine the values for the steering angle and the wheels angle.

In various embodiments, the method applies the nonlinear filter iteratively to asymptotically track the target value, such that the constraints are satisfied at each iteration 410. Each iteration 410 can be implemented for one control step of the control, such that for each time step of the control, the method determines 404 torques for the column motor and the rack motor according to the values for the steering angle and the wheels angle, and generate 405 the control command to apply the torques. In such a manner, both the steering wheel and the vehicle wheels are controlled concurrently, i.e., at each time step of the control.

Figure 5:
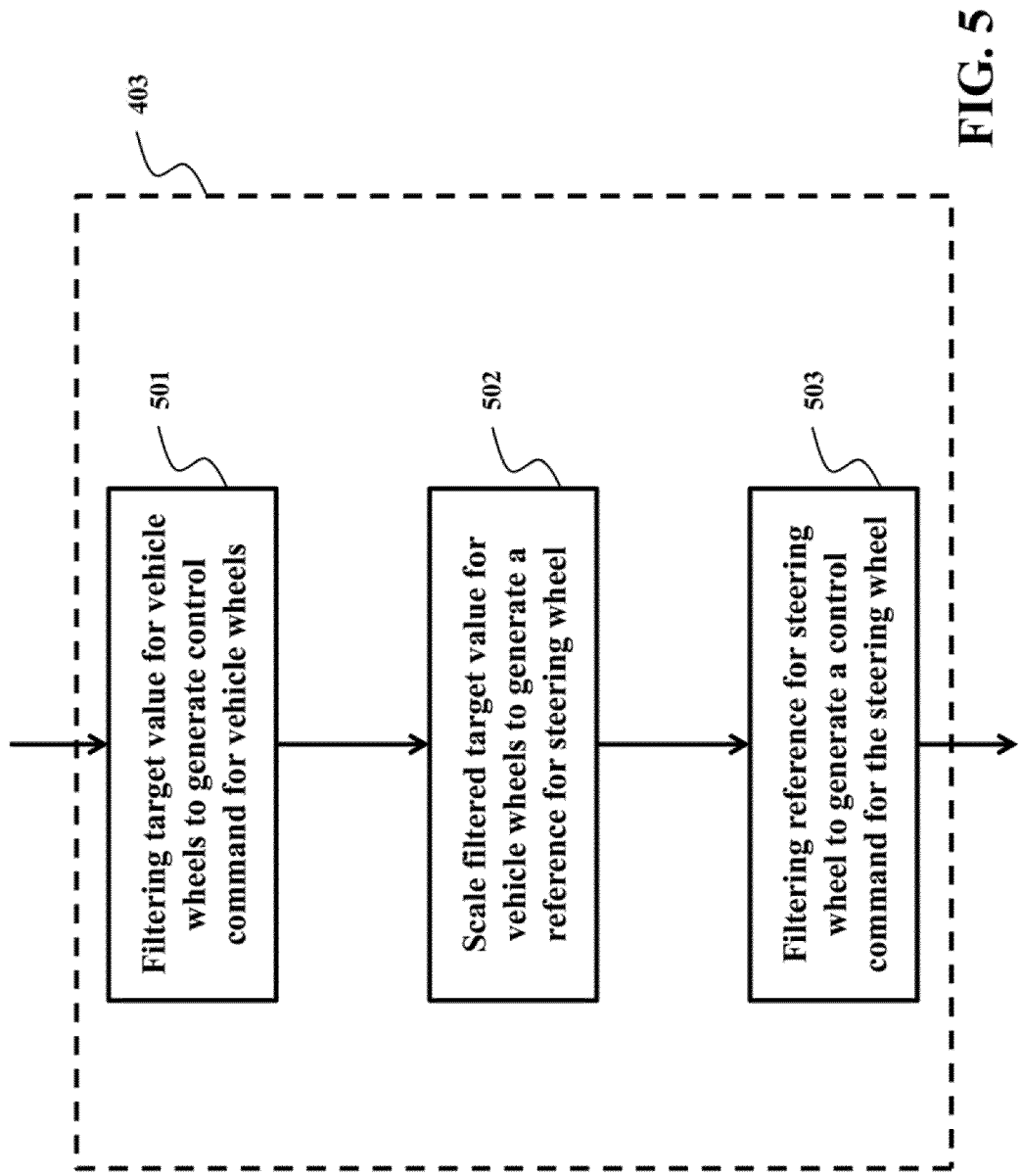
FIG. 5 is a flow chart of a method for implementing the nonlinear filtering according to one embodiment of the invention.

FIG. 5 shows a flow chart of a method for implementing the nonlinear filtering 403 according to one embodiment. The embodiment dynamically modify 501 the target value for vehicle wheels by a first nonlinear filter so that the modified target value when applied as a control command to the vehicle wheels controller guarantees that the constraints on the vehicle wheels are satisfied. The filtered target value is then scaled 502 by g to generate a reference for the steering wheel system. Such reference is not guaranteed to satisfy the constraints of the steering wheel system. Thus, the control command for the steering wheel is generated by dynamically modifying 503 the reference value by a second nonlinear filter such that the filtered reference value when applied as a control command to the steering wheel controller guarantees that the constraints on the steering wheel are satisfied.

Figure 6:
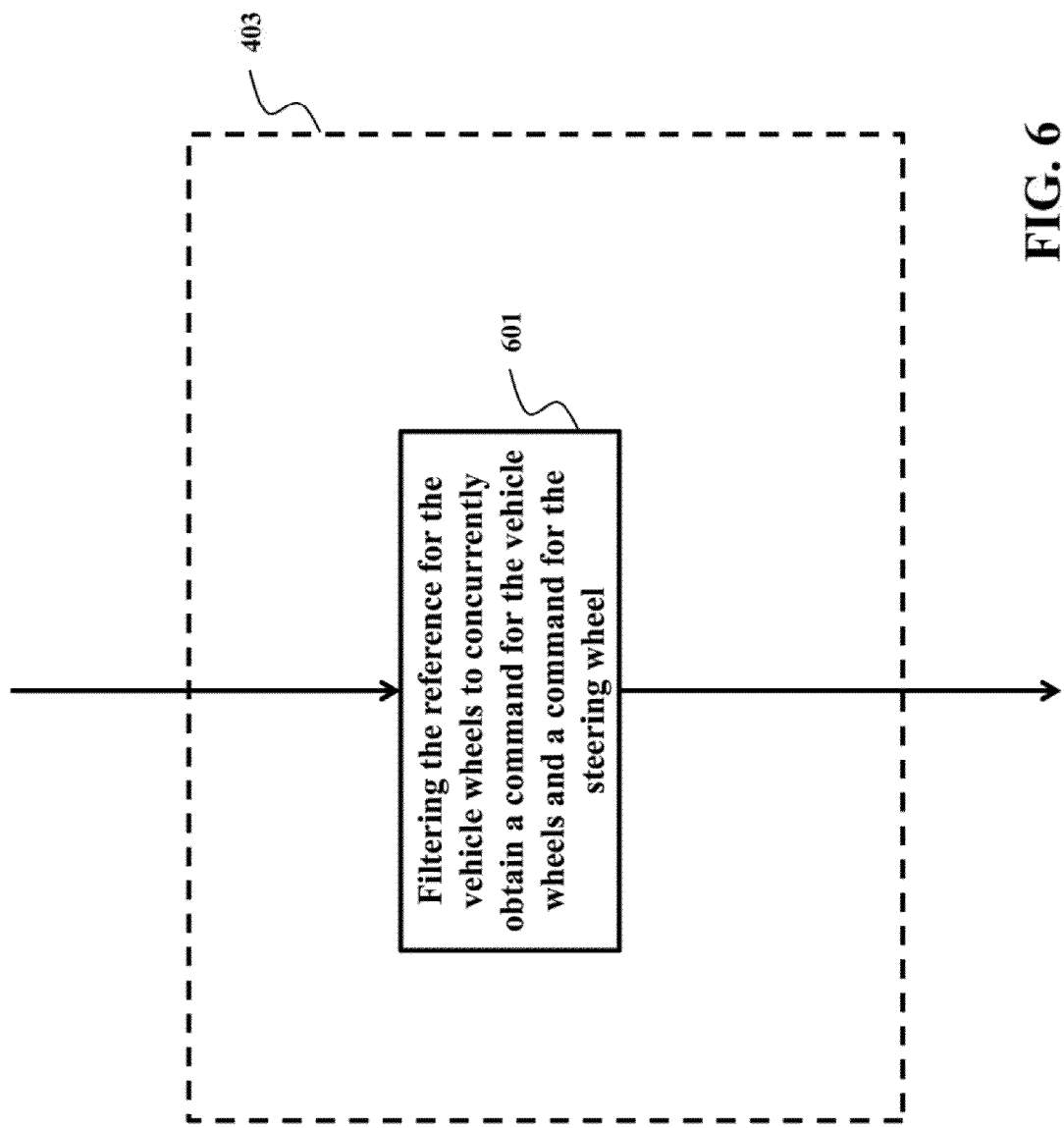
FIG. 6 is a flow chart of a method for implementing the nonlinear filtering according to another embodiment of the invention.

FIG. 6 shows a flow chart of a method for implementing the nonlinear filtering 403 according to another embodiment of the invention. In that embodiment, a single multivariable nonlinear filter is used to concurrently generate 601 from the target value for the vehicle wheels received from the SADP system the control command for the angle of the steering wheel and the control command for the angle of the vehicle wheels, which guarantees the satisfaction of the constraints on the steering wheel, on the vehicle wheels, and the constraints on the relative behavior of the steering wheel and the vehicle wheels.

Control Invariant Set

Some embodiments of the invention ensure satisfaction of the constraint on the states of the vehicle wheels and the steering wheel using the concepts from invariant set theory. For example, some embodiments generate the control commands to the commands to the column and rack controllers to modify the states of the steering wheel and the vehicle wheels to be included into a positive invariant subset of a feasible region of feasible values of the steering angle, wheels angle, and states of the steering wheel and the vehicle wheels.

For example, the feasible region can be predetermined in advance by values of the steering angle, wheels angle, and states of the steering wheel and the vehicle wheels satisfying the constraints 125. The control invariant subset of the feasible region can also be predetermined to ensure the satisfaction of constraint for subsequent time steps of the control.

Figure 7A:
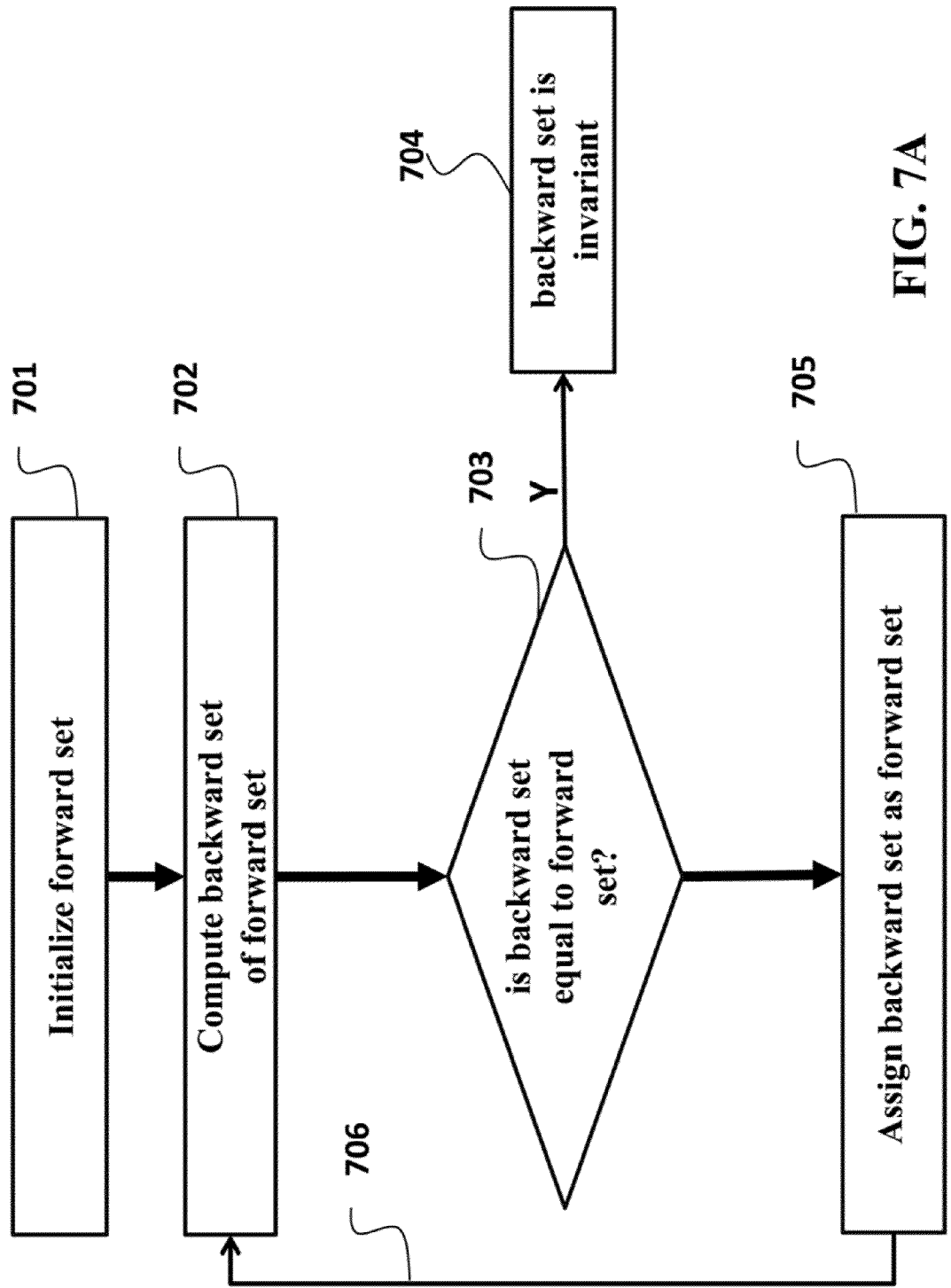
FIG. 7A is a block diagram of a method for determining control invariant subset of the feasible region according to one embodiment.

FIG. 7A shows a block diagram of a method for determining control invariant subset of the feasible region according to one embodiment. A current set is initialized 701 as the set of feasible states, i.e., the states of the feasible region satisfying the constraints. From the current set, a backward reachable set is computed 702 to determine the states within the current set that after a one step evolution of the system dynamics are inside the current set. If 703 the backward reachable set contains or equals the current set, then 704 the current set is the maximal control invariant set. Otherwise 705, the backward reachable set intersects with the current set, and used as the new current set, in a repetition 706 of the method.

Mathematically, the control invariant set can be formulated as follows. Given a system $$x(k+1)=f(x(k))$$

where x is the system state, and f is the state update function, subject to the constraints $$g(x(k)) \leq 0$$

where g is the constraint function, a control invariant set O is a set of states such that $$x(k) \in O \Rightarrow x(h) \in O, g(x(h)) \leq 0, \forall h \geq k,$$

wherein k and h are indices of time steps of the control.

Figure 7B:
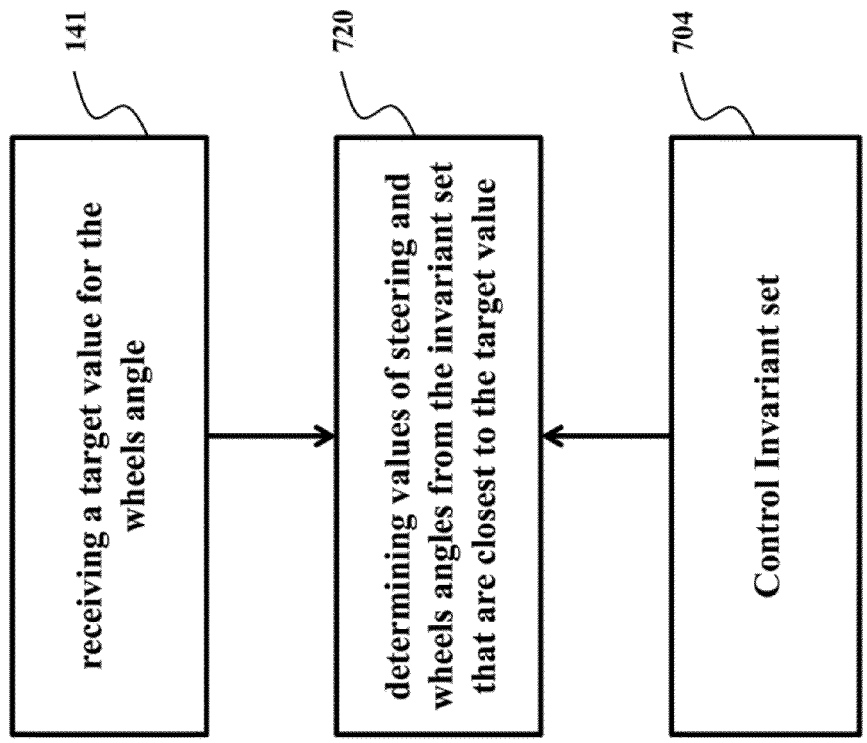
FIG. 7B is a block diagram of a method for determining the values for the steering angle and the wheels angle based on the control invariant set according to one embodiment of the invention.

FIG. 7B shows a block diagram of a method determining the values for the steering angle and the wheels angle based on the control invariant set according to one embodiment. During the semi-autonomous driving of the vehicle, the control commands for the wheels angle and the steering angle is generated such that the control commands and states of the steer-by-wire system obtained by controlling the steering wheel and the vehicle wheel according to control commands are entirely within the control invariant set. For example, one embodiment, upon receiving 141 the target value for the wheel angle, determines 720 the values for the steering angle and the wheels angle from the control invariant set that are closest to the target value. This embodiment can achieve maximum speed of the tracking the target value satisfying the constraints on the state of the vehicle and components of the vehicle, constraints on the driver-interface, and constraints on the relative misalignment of the steering wheel and vehicle wheels for all the future time step of control. For example, such computation can be performed by solving a constrained quadratic program.

Design of a First and a Second Nonlinear Filter

In one embodiment of this invention two nonlinear filters 501 and 503 are designed to generate the control commands to the column and rack controllers. The combination of the filters first optimizes the state of the vehicle wheels system to the command of the semiautonomous driving planning system, and, then, based on the results of such that optimization optimizes the state of the steering wheel system.

Figure 8:
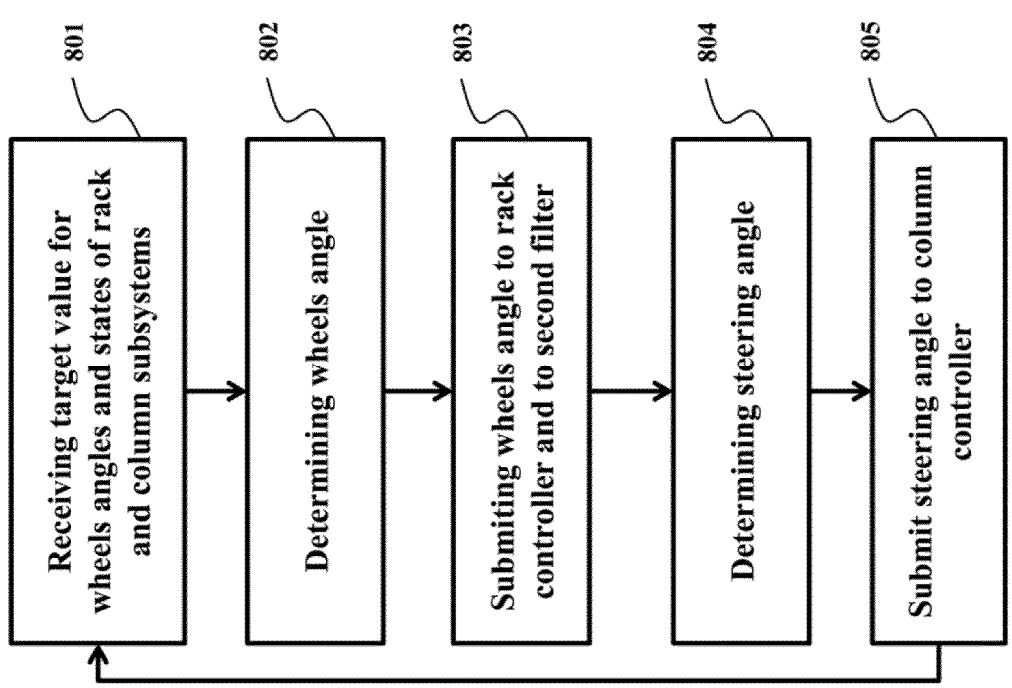
FIG. 8 is a flow chart of a method employing the first and the second nonlinear filters for controlling the steering angle and the wheels angle according to one embodiment of the invention.

FIG. 8 shows a flow chart of a method employing the first and the second nonlinear filters for controlling the steering angle and the wheels angle according to one embodiment. After receiving 801 the target value for the wheels angles and the states of rack and column subsystems, a first filter determines 802 the value of the wheels angle and submits the wheels angle to rack controller and to the second filter. The second filter uses the wheels angle determined by the first filter to determine 804 the value of the steering angle, and submits 805 the steering angle to the column controller.

The first filter is designed to quickly react to the target value received from the SADP system, while satisfying the constraints on the vehicle wheels system for the current state of the vehicle wheels system.

According to some embodiments, the feasible space for system (5), (7) from (9), (10), (11), (15a) is $$H_r x_r \leq K_r, \quad (24)$$

wherein $H_r$, $K_r$ are the constraint matrix, and the constraints vector, that are defined in equations (9), (10), (11), (15a).

The system determined by in equations (5), (7) is augmented with the command dynamics equation $$v_r(k+1)=v_r(k), \quad (25a)$$

wherein $v_r$ is the vehicle wheels feedforward command.

A subset of the feasible space of the vehicle wheels system is computed as the control invariant set $O_r$, for instance using the algorithm in FIG. 7A applied to system determined by in equations (5), (7), (25) and constraints in equations (24). Then, as shown in FIG. 8 at every control cycle, the target value of the vehicle wheels angle from the semi-autonomous driving planning system is received, the state of the vehicle wheels system is read and the command is generated by solving the optimization problem $$\min_{v_r}(v_r - r)^2 \quad (26)$$

$$\text{s.t.} \quad (x_r, v_r) \in O_r.$$

The embodiment filters the signal r by finding the closest command value such that from the current state, applying such value constantly in the future as command of the vehicle wheels controller, none of the system constraints are violated.

The second filter generates the command to the column controller, based on the state of the steering wheel system and the output of the first nonlinear filter.

The feasible space for system (6), (8) from (12), (13), (14), (15b) is described as $$H_w x_w \leq K_w, \quad (27)$$

wherein $H_w$, $K_w$ are the constraint matrix, and the constraints vector, that are described by (12), (13), (14), (15b).

The system determined by in equations (6), (8) is augmented with the command dynamics equation $$v_w(k+1)=v_w(k), \quad (25b)$$

wherein $v_w$ is the vehicle wheels feedforward command.

A subset of the feasible space of the vehicle wheels system is computed as the control invariant set $O_w$, for instance using the algorithm in FIG. 7A. Then, at every control cycle, the command from the first filter is received, the state of the steering wheel system is read and the filtered command is generated by solving the optimization problem $$\min_{v_w}(v_w - gv_r)^2 \quad (28)$$

$$\text{s.t.} \quad (x_w, v_w) \in O_w.$$

The second filter filters the output of the first filter by determining the closest value to the output of the first filter scaled by g such that from the current state, applying such value constantly in the future as command of the steering wheel controller, none of the system constraints is violated.

Design of a Multivariable Nonlinear Filter

In other embodiments of the invention the first and second filter are substituted with a single multivariable nonlinear filter. By using such filter it is possible to enforce constraints in equations (16)-(21) and to concurrently optimize the behavior of the entire system in response to the semiautonomous driving planning system, rather than first optimizing the vehicle wheels system, and, based on the results of that, optimizing the steering wheel system.

The feasible space for system in equations (5)-(8) from in equations (11)-(15b) with possibly one or a combination of in equations (16)-(21) is described as $$H_{rw}\begin{bmatrix} x_r \\ x_w \end{bmatrix} \leq K_{rw}, \quad (29)$$

wherein $H_{rw}$, $K_{rw}$ are the constraint matrix, and the constraints vector, that are described by equations (11)-(15b) with possibly one or a combination of in equations (16)-(21).

The system determined by in equations (5)-(8) is augmented with both command dynamics equations (25a), (25b)

Figure 9:
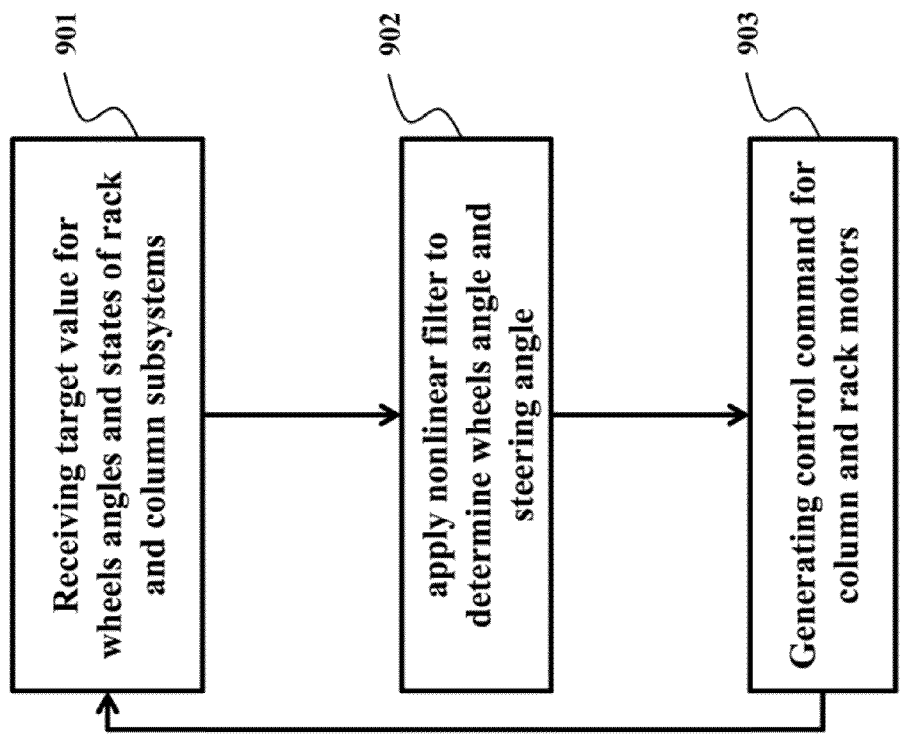
FIG. 9 is a flow chart of a method employing the multivariable nonlinear filter for controlling the steering angle and the wheels angle according to another embodiment of the invention.

FIG. 9 shows a flow chart of a method employing the multivariable nonlinear filter for controlling the steering angle and the wheels angle according to another embodiment. A subset of the feasible space of the vehicle wheels system is computed as an control invariant set $O_{sbw}$, for instance using the method in FIG. 7. Then, at every control cycle, the target value for the wheels angles and the states of rack and column subsystems are received 901, and the multivariable nonlinear filter solves 902 a multivariable optimization problem $$\min_{v_w} q(v_r - r)^2 + (v_w - g v_r)^2 \quad (30)$$

$$s.t. \left( \begin{bmatrix} x_r \\ x_w \end{bmatrix}, \begin{bmatrix} v_r \\ v_w \end{bmatrix} \right) \in O_{sbw}.$$

The solution 902 concurrently generates the steering angle and the wheels angle, and those values are used by the controllers to generate 903 the control commands for the column and rack motors.

Some embodiment determine the nonnegative weight q in the optimization problem (30) to balance between the alignment maintenance and fast response to the request of the SADP system. For example, increasing the weight q increases the rapidity of the response to the change of the target value, decreasing q increases the alignment between the steering wheel and the vehicle wheels. In another embodiment of this invention, the cost function (23) is added to the cost function in the filter (30) for minimization.

Computation of Filter Outputs by Quadratic Programs

In some embodiments where the computation of the control invariant set invariant set is based on the method in FIG. 7A, the invariant sets $O_r$, $O_w$, $O_{sbw}$ are represented by linear inequalities in the form $$O_r = \{(x_r, v_r) : M_r x_r + N_r v_r \leq L_r\}, \quad (31)$$

$$O_w = \{(x_w, v_w) : M_w x_w + N_w v_w \leq L_w\}, \quad (32)$$

$$O_{sbw} = \left\{ \left( \begin{bmatrix} x_r \\ x_w \end{bmatrix}, \begin{bmatrix} v_r \\ v_w \end{bmatrix} \right) : M_{sbw} \begin{bmatrix} x_r \\ x_w \end{bmatrix} + N_{sbw} \begin{bmatrix} v_r \\ v_w \end{bmatrix} \leq L_w \right\}, \quad (33)$$

where matrices $M_r$, $M_w$, $M_{sbw}$, $N_r$, $N_w$, $N_{sbw}$, and vectors $L_r$, $L_w$, $L_{sbw}$ are determined by the method in FIG. 7.

Thus, the filter problems (26) (28) (30) that determine the filter outputs can be solved by means of constrained quadratic programming. For instance, problem (30) can be formulated as a convex constrained quadratic program $$\min_{v_r, v_w} [v_r \; v_w] \begin{bmatrix} q+g^2 & -g \\ -g & 1 \end{bmatrix} \begin{bmatrix} v_r \\ v_w \end{bmatrix} + r[-2q \; 0] \begin{bmatrix} v_r \\ v_w \end{bmatrix} + qr^2 \quad (34)$$

$$s.t. \; M_{sbw} \begin{bmatrix} x_r \\ x_w \end{bmatrix} + N_{sbw} \begin{bmatrix} v_r \\ v_w \end{bmatrix} \leq L_{sbw}$$

Thus, the filters can be computed by finding the solution of the quadratic program, by a quadratic programming algorithm and then using as output of the filter the values $V_r$, $v_w$ that attain the optimum.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for a semi-autonomous driving of a vehicle with a steer-by-wire system having a steering wheel mechanically decoupled from vehicle wheels, such that a steering angle of the steering wheel is controlled by a column motor independently from a wheels angle of the vehicle wheels controlled by a rack motor, comprising:
   receiving from a semi-autonomous driving planning (SADP) system a target value for the wheels angle;
   determining values for the steering angle and the wheels angle tracking the target value of the wheels angle subject to constraints including a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels; and generating control commands to the column motor and the rack motor according to the values for the steering angle and the wheels angle, wherein steps of the method are performed by a processor.

2. The method of claim 1, wherein the determining comprises:

applying iteratively a nonlinear filter to the target value of the wheels angle to determine the values for the steering angle and the wheels angle, such that the constraints are satisfied at each iteration.

3. The method of claim 2, wherein the nonlinear filter includes a first filter and a second filter, further comprising:

applying the first filter to the target value of the wheels angle to produce the value of the wheels angle;

scaling the value of the wheels angle to produce a scaled value of the wheels angle; and applying the second filter to the scaled value of the wheels angle to produce the value of the steering angle.

4. The method of claim 2, wherein the nonlinear filter includes a multivariable nonlinear filter, further comprising:

determining concurrently at each time step of the control the values for the steering angle and the wheels angle.

5. The method of claim 1, wherein the determining comprises:

determining the values of the steering angle and the wheels angle from a invariant set that are closest to the target value.

6. The method of claim 1, wherein the target value for the wheels angle is determined based on a state of a movement of the vehicle and an objective of the movement of the vehicle, such that the target value is misaligned with a state of the steering wheel.

7. The method of claim 1, wherein the constraint on the motion of the vehicle wheels include one or combination of a constraint on the wheels angle, a constraint on a rate of change of the wheels angle and a constraint on an angular acceleration of the wheels angle, wherein the constraint on the motion of the steering wheel includes one or a combination of a constraint on the steering angle, a constraint on a rate of change of the steering angle and a constraint on an angular acceleration of the steering wheel, and wherein the constraint on the relative motion of the steering wheel with respect to the motion of the vehicle wheels includes one or combination of a constraint on a difference between a scaled wheels angle and the steering angle, a constraint on a difference between a scaled value of the wheels angle and the value of the steering angle, a constraint on a difference between a scaled rate of change of the wheels angle and the rate of change of the steering angle, and a constraint on a difference between a scaled angular acceleration of wheels angle and the angular acceleration of the steering angle.

8. The method of claim 1, wherein the determining comprises:

optimizing a cost function specifying a first relationship between the value of the wheels angle and the target value of the wheels angle, and a second relationship between the value of the steering angle and the value of the wheels angle, wherein the optimizing is subject to the constraints.

9. The method of claim 8, wherein the first relationship includes a squared difference between the value of the wheels angle and the target value of the wheels angle, multiplied by a nonnegative constant, and wherein the second relationship includes a squared difference between a scaled value of the wheels angle and the value of the steering angle.

10. The method of claim 9, further comprising:

determining a value of the nonnegative constant to balance a rapidness of tracking the target value of the wheels angle with a rapidness of alignment of the steering angle with the wheels angle, wherein increasing the value of the nonnegative constant increases the rapidness of tracking the target value by the wheels angle and decreasing the value of the nonnegative constant increases the rapidness of alignment of the steering angle with the wheels angle.

11. The method of claim 1, further comprising:

determining a feasible region of values of the steering angle, wheels angle, and states of the steering wheel and the vehicle wheels satisfying the constraint;

determining a invariant set as a part of the feasible region, such that after a one step evolution of dynamics of the steer-by-wire system the values of the steering angle, wheels angle, and the states of the steering wheel and the vehicle wheels are inside the invariant set; and selecting values for the steering angle and the wheels angle from the invariant set.

12. The method of claim 11, wherein the selecting is based on a solution of a constrained quadratic program.

13. A steer-by-wire system for controlling an operation of a vehicle, comprising:

a steering rack subsystem for controlling a wheels angle of vehicle wheels via a motion of a rack motor;

a steering column subsystem for controlling a steering angle of a steering wheel via a motion of a column motor, wherein the steering wheel is mechanically decoupled from the vehicle wheels, such that the steering angle of the steering wheel is controlled by the column motor independently from the wheels angle of the vehicle wheels controlled by the rack motor; and a control system, comprising:

a semi-autonomous driving planning (SADP) system for determining a target value for the wheels angle; and an electronic control unit (ECU) for determining values for the steering angle and the wheels angle tracking the target value of the wheels angle subject to constraints including a constraint on a motion of the vehicle wheels, a constraint on a motion of a steering wheel, a constraint on an actuation of the steering wheel and the vehicle wheels, and a constraint on a relative motion of the steering wheel with respect to the motion of the vehicle wheels, and for generating control commands to the column motor and the rack motor according to the values for the steering angle and the wheels angle.

14. The steer-by-wire system of claim 13, wherein the ECU comprises:

a governor for nonlinearly filtering the target value of the wheels angle based on a state of the steering rack subsystem and of a state of the steering column subsystem to produce the values for the steering angle and the wheels angle;

a column controller for determining the control command to the column motor based on the value of the steering angle; and a rack controller for determining the control command to the rack motor based on the value of the steering angle.

15. The steer-by-wire system of claim 14, wherein the governor includes a first filter and a second filter, and wherein the governor applies the first filter to the target value of the wheels angle to produce the value of the wheel angle, scales the value of the wheel angle to produce a scaled value of the wheel angle; and applies the second filter to the scaled value of the wheel angle to produce the value of the steering angle.

16. The steer-by-wire system of claim 14, wherein the governor includes a multivariable nonlinear filter, and wherein the governor determines concurrently at each time step of the control the values for the steering angle and the wheels angle.

17. The steer-by-wire system of claim 13, wherein the ECU determines the values for the steering angle and the wheels angle from a invariant set by solving a constrained quadratic program selecting the closest values to the target value from the invariant set.

\* \* \* \* \*